United States Patent
Simonds

(10) Patent No.: US 12,132,646 B1
(45) Date of Patent: Oct. 29, 2024

(54) HIGH-SPEED DATA FORWARDER

(71) Applicant: Amazon Technologies, Inc., Reno, NV (US)

(72) Inventor: Mark LeRoy Simonds, Parker, CO (US)

(73) Assignee: Amazon Technologies, Inc., Reno, NV (US)

( * ) Notice: Subject to any disclaimer, the term of this patent is extended or adjusted under 35 U.S.C. 154(b) by 131 days.

(21) Appl. No.: 17/357,718

(22) Filed: Jun. 24, 2021

(51) Int. Cl.
*H04L 45/24* (2022.01)
*H04L 12/18* (2006.01)
*H04L 45/64* (2022.01)

(52) U.S. Cl.
CPC ............ *H04L 45/24* (2013.01); *H04L 12/18* (2013.01); *H04L 45/64* (2013.01)

(58) Field of Classification Search
CPC .......... H04L 12/18; H04L 45/24; H04L 45/64
USPC ................... 709/231–232, 238–242; 370/355
See application file for complete search history.

(56) References Cited

U.S. PATENT DOCUMENTS

| | | | | |
|---|---|---|---|---|
| 2015/0127701 A1* | 5/2015 | Chu | ..................... | H04L 43/0894 709/201 |
| 2016/0226753 A1* | 8/2016 | Young | ..................... | H04L 45/64 |
| 2021/0320820 A1* | 10/2021 | Ruan | ..................... | H04L 49/602 |
| 2022/0327230 A1* | 10/2022 | Palod | ..................... | G06F 21/53 |

* cited by examiner

*Primary Examiner* — Melvin H Pollack
(74) *Attorney, Agent, or Firm* — Hogan Lovells US LLP

(57) ABSTRACT

Approaches in accordance with various embodiments provide an overlay network comprised of interconnected peer instances, which can be used for purposes such as data multicasting, high performance computing, or massive parallel processing. The overlay network can sit on top of a routing layer or fabric of interconnected peer devices that can support large message sizes and/or provide for equal cost, multipath routing. Such an overlay network can provide for high bandwidth data transmission in a cloud or shared-resource environment, as well as for isolated networks that may have otherwise limited gateways.

20 Claims, 10 Drawing Sheets

HIGH-SPEED DATA FORWARDER

BACKGROUND

In many computing or network environments, it may be desirable to transmit a large stream of data. In certain environments, however, there may be limitations on the bandwidth for any given transmission. Further, it may be desirable to process a data stream using high performance computing (HPC) or massive parallel processing, for example, but there may be more data to be processed than can be handled by a single computing resource. Various approaches exist for spreading a data stream and/or workload out among multiple computing resources, but this typically occurs relatively slowly or has limited message size, introducing an unacceptable amount of latency or complexity for various use cases.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the transmission and/or processing of data streams. In particular, various approaches provide for high bandwidth transmission of data streams in environments where there may be limits on individual data transmissions. In at least one embodiments, a network fabric may be provided, obtained, or accessed that is comprised of a set of peer devices. These peer devices can include, for example, computing devices or compute instances, such as may comprise physical and/or virtual resources, or portions or combinations thereof. These peers can support equal cost, multi-path routing. An overlay network can be provided on top of this network fabric to provide for high speed data routing, where each peer can function as a virtual router to route data along one or more paths through the overlay network. Use of multiple paths (i.e., that run at least partially concurrently and in parallel) can allow for higher bandwidth transmission of the data stream, such as through multicast operation. Peers along a given path can also perform processing on the data stream, such as may relate to one or more user-supplied applications. The applications can process the stream in sequence or in parallel, or combinations thereof, depending at least in part upon the configuration of paths and selection of peers across the overlay network. Such functionality can be advantageous for environments such as isolated networks, which may have network gateways with limited bandwidth that cannot otherwise provide, for example, high bandwidth data transmission for live data streams.

Various other such functions can be used as well within the scope of the various embodiments as would be apparent to one of ordinary skill in the art in light of the teachings and suggestions contained herein.

Figure 1:
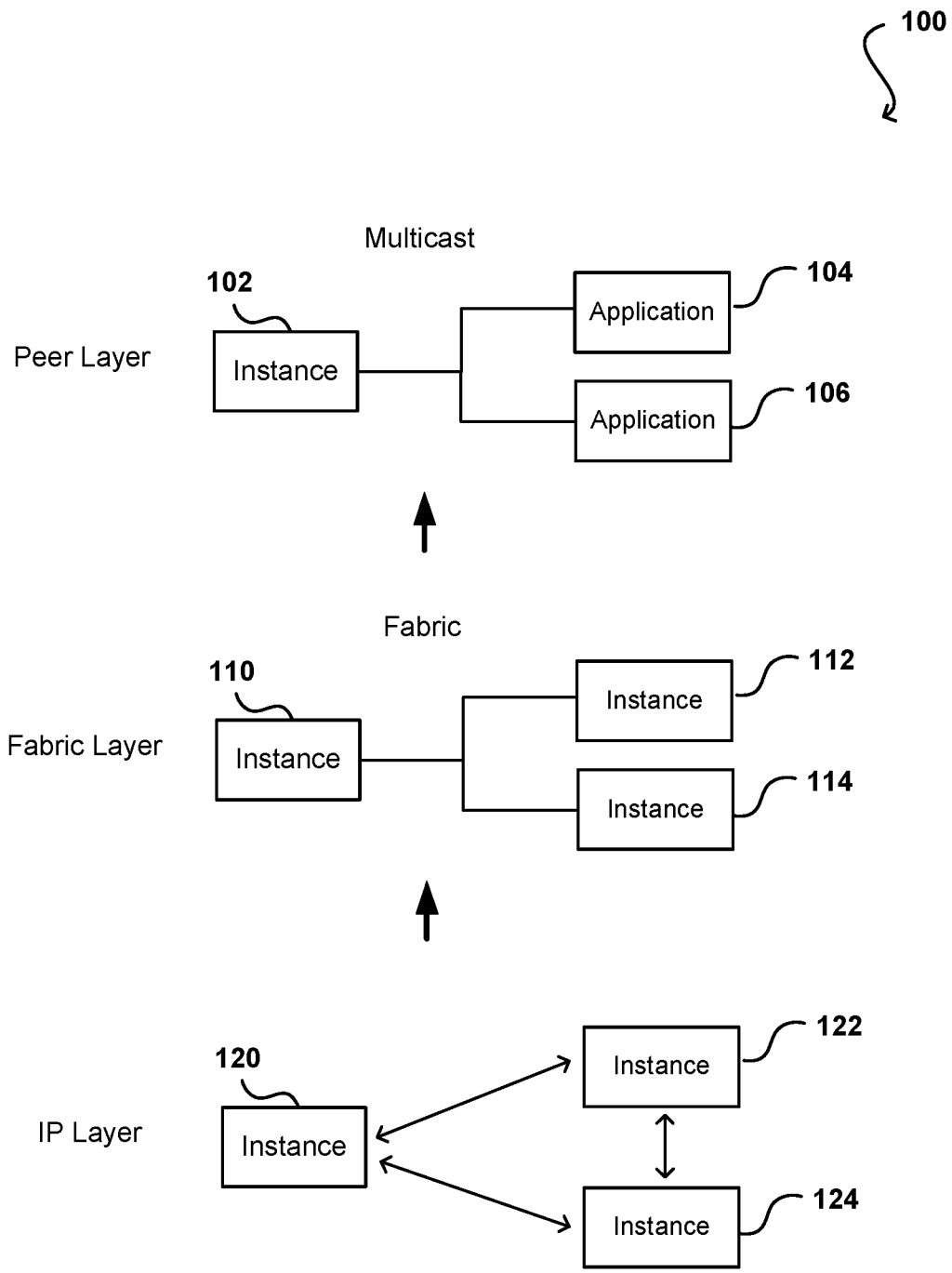
FIG. 1 illustrates an example data transmission system that can be utilized in accordance with various embodiments.

FIG. 1 illustrates a layered configuration 100 of components that can be used for data transmission. As illustrated, this can include a multicast layer, peer layer, or overlay network operating on top of a network fabric layer. In at least one embodiment, the overlay network can be provided as part of a High Speed Data Forwarder (HSDF) solution. In at least one embodiment, an HSDF corresponds to an executable and/or container that supports to use of an elastic fabric adapter to create one or more data chains. These chains can provide for the linking of data streams between computing resources, or resource instances, such as virtual machines operating on one or more physical resources. Each virtual instance can offer at least a portion of the processing, memory, and other capacity of a physical resource, where those instances can operate as if they are separate physical resources. In at least one embodiments, these instances may be offered by a cloud service, such as the Amazon Elastic Compute Cloud (EC2) service. These various chains enable one or more paths to be created, using various instances, to provide the ability to "fan-out" streams of data at relatively high speeds, such as speeds above 5 Gpbs (e.g., up to 100 Gbps or more) for systems that might otherwise be limited at that bandwidth.

An ability to provide data streams at these higher speeds can be beneficial in many instances, such as for isolated or limited-capacity networks that may otherwise have only limited bandwidth interfaces or processing resources available. Lack of a "fan-out" or multicast capability can prevent successful migration to various services. Various isolated regions may lack a type of transit gateway that allows for multicast traffic, or at least that allows for multicast traffic at higher speeds and bandwidths needed for tasks such as transmission of video to multiple recipients. Regions that utilize transit gateways are therefore often limited to transmission of smaller data instances, such as for small messages or posts. Even outside such isolated regions, however, there are many situations where insufficient bandwidth is available to perform parallel processing on large data streams.

The communication fabric illustrated in FIG. 1 can be provided or utilized as part of a high speed data forwarder (HSDF) implementation. Such a fabric can be provisioned inside a subnet, such as a virtual private cloud (VPC) offered by Amazon Web Services, Inc. In such a communication fabric, each peer (e.g., compute instance) can be interconnected to at least one other peer. Further, each peer can act as a virtual router for at least a portion of a data stream. Such an implementation can help to migrate applications that depend on a high speed multicast networking environment. Such an implementation can also support architectures such as those for High Performance Computing (HPC) and Massive Parallel Processing (MPP). In at least one embodiment, such a peer-to-peer communications fabric can support standard communications protocols, such as TCP/IP, or a high speed, low latency 100 Gbps elastic fabric adapter, among other such options.

As illustrated, a peer layer or multicast layer can included individual peers or instances 102, that can support multiple applications 104, 106. This peer layer can sit on top of a network fabric layer that can provide connections between instances 110, 112, 114. The fabric layer can be created between these various instances, such as by using an R×M fabric for TCP or an Elastic Fabric Adapter (EFA) fabric for SRD (Scalable Relatable Datagram). The fabric layer in this example sits on top of an IP layer, such as where a virtual private cloud composed of multiple connected instances 120, 122, 124 forms an underlying base layer. Such a layered approach can enable a large data stream to be transmitted to multiple clients or other such recipients. This data stream can be passed to multiple compute instances, or peers, in order to process all of the data, including the ability to process using multiple different applications or processes. The multicast layer functions as a type of overlay network that can sit on top of the IP layer and process data at very high speeds. In one example, a live sporting event broadcast may capture multiple high resolution, uncompressed video streams that need to be quickly processed then broadcast. Such an approach can not only enable these large streams to be processed quickly, but can also allow for various types of processing to be performed, such as by using multiple processing paths as discussed later herein.

In a conventional on-premise data center, a customer might be able to simply configure a router to perform multicast since the customer has full control over the network environment and the resources are directly connected. Because the resources may all be substantially co-located, the customer does not need to work about issues such as packet loss. In a shared resource or cloud environment, however, data may be shared across resources in a much larger data center operated by another entity, such that there may be no guarantee than any or all of the shared or "cloud" resources allocated to a given customer will be co-located. For example, different computing resources may be in different server racks, different server pods, different data centers, or different geographical regions, among other such options. These customer may desire to have at least the same, or similar, levels of performance for their cloud resources as they would have in a dedicated data center or network environment.

The layered network approach of FIG. 1 can be built upon an IP layer of a cloud environment, such as a virtual private cloud in AWS. A network fabric layer can sit on this IP layer, which can provide for high performance computing (HPC) between compute instances, such as instances in EC2. In at least one embodiment, an adapter such as the elastic fabric adapter (EFA) can be used to enable HPC between individual compute instances. In at least one embodiment, this fabric layer can be designed or extended to provide connection between multiple nodes that can intercommunicate and share a data stream. A multicast layer can then be built on top of the fabric layer, where additional technologies can be enabled inside of each peer. As an example, this peer layer can provide for multicast functionality among peer instances.

Figure 2:
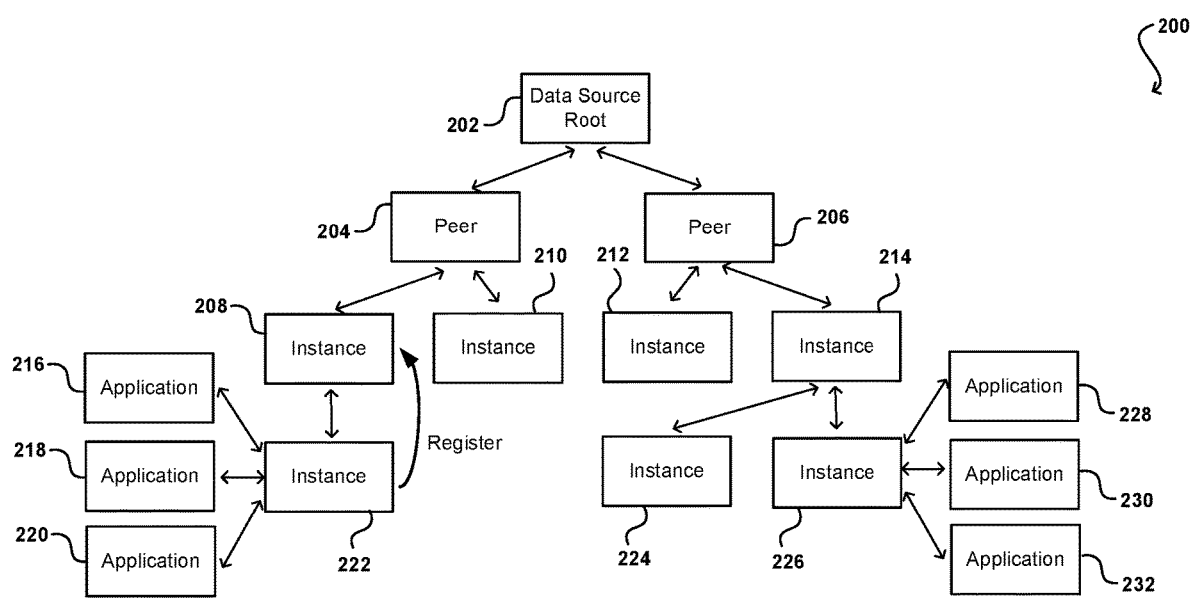
FIG. 2 illustrates an example resource hierarchy that can be utilized in accordance with various embodiments.

FIG. 2 illustrates an example peer-to-peer multicast overlay network 200 that can be utilized as part of an HSDF offering in accordance with at least one embodiment. In this hierarchical network design, a given instance 202 will function as a data source root. This data source root can direct the data stream to two different peer instances 204, 206. In this example, each peer can act as a data router, and this fabric can be used to move messages from a respective data source. These peer instances 204, 206 can each decide to route the data stream to additional peer instances 208, 210, 212, 214. One or more instances 222, 224, 226 at a lower level can register with a peer instance such that the instance (e.g., instance 222 or 226) can receive the data stream in order to execute one or more applications 216, 218, 220, 228, 230, 232 on the data stream, where these can include instances of the same or different applications or processes to be executed on the data stream.

In at least one embodiment, an HSDF fabric can utilize any of a number of different options. For example, this can take the form of a standard unicast fabric using TCP/IP sockets (e.g., R×M). If using an EFA-based solution, such a fabric can provide for scalable transport offload, such as by using the Scalable Reliable Datagram (SRD) protocol. A given process can use a single queue pair to communicate with any number of peers. For example, there may be multiple ways to move data between two computers in a data center, and an appropriate or even optimal path can be selected using ECMP. Further, data can be sent across multiple paths and the reassembled. The use of HSDF on top of this ECMP routing capability allows each node to have multiple applications sitting thereon, which can run multicast or share in the stream. Thus, the EFA can provide the ability to route data between peer instances, for example, and the HSDF layer can take several of these instances and connect them together to create a virtual network where the included peer instances can share a single data stream. Each peer instance can also provide additional functionality, such as can provide for multicast transmission. For users who have large investments in multicast applications, these applications can be moved into the cloud with minimal changes, such as to register to send or receive data in an HSDF-based network.

An EFA-based solution can enable resource-intensive applications, such as HPC and machine learning applications, to be run at scale. An example EFA interface can enable users to run these and other types of applications that may require high levels of inter-node communications at scale on a cloud resource solution, such as AWS. An operating system (OS) bypass hardware interface can enhance the performance of inter-instance communications, which can be important for scaling these and other such applications. As an example for an EFA-based implementation, High Performance Computing (HPC) applications using the Message Passing Interface (MPI) and Machine Learning (ML) applications using NVIDIA Collective Communications Library (NCCL) can scale to thousands of CPUs or GPUs. As a result, application performance of on-premises HPC clusters can be obtained with the on-demand elasticity and flexibility of a shared resource environment or cloud-based implementation. EFA also works with commonly-used interfaces, APIs, and libraries for inter-node communications, so that HPC applications can be migrated to a cloud environment with little or no modifications.

Such a fabric can also provide for, or take advantage of, equal-cost multi-path routing (ECMP). Packet spraying can be used to prevent hot spots, and to provide for fast and transparent recovery from failures, within timeout resolution on the order of microseconds in many instances. A routing strategy such as ECMP can provide for the routing of packets to a single destination over multiple selected or optimal paths, and with similar or equal routing priority. Multi-path routing can be used with most routing protocols as local decisions can be made independently at each router. ECMP can substantially increase bandwidth in a deployment by load-balancing traffic across these multiple paths. ECMP can be thought of as a series of point-to-point connections, but there can be multiple paths used to obtain a single path, which can provide for lower latency. On top of that, HSDF can intersperse the multicast. Such an approach to multicast enables data to be transferred much faster than in conventional multicast applications, such as transmission rates of 10 Gbps, 12 Gbps, or 15 Gbps, rather than around 2.5 Gbps, with a total bandwidth utilization of around 99 Gbps or more.

In one example, a data source might be an uncompressed 4K video stream or other dense video stream. There may be at least two algorithms that need to be applied to process that data stream. For example, one algorithm might analyze the data stream for the occurrence of certain images, which another algorithm might perform compression so the data stream can be directed to another serviced to transmit live video streams to various client devices. Conventional systems with standard multicast can be limited to a lower bandwidth, due at least in part to a limitations on message size. With standard multicast, a transmission may be limited to around 1,500 bytes per packet for UDP messages, which may be further limited if those packets are to be transmitted across multiple routers. The video stream would then need to be split into multiple streams and recombined after processing, which can generate a potential combining problem. An HSDF system as presented herein can instead utilize the dense, raw video stream as-is, without having to split the stream into multiple sub-streams. The single stream can also be sent it directly as a single stream, as the stream can be transmitted at a much higher bandwidth. Using an example HSDF solution, message sizes on the order of 65,500 bytes or larger can be transmitted in multicast, enabled in part by layering HSDF on a technology such as EFA where local host multicast allows for use of these larger multicast message sizes.

Figure 3:
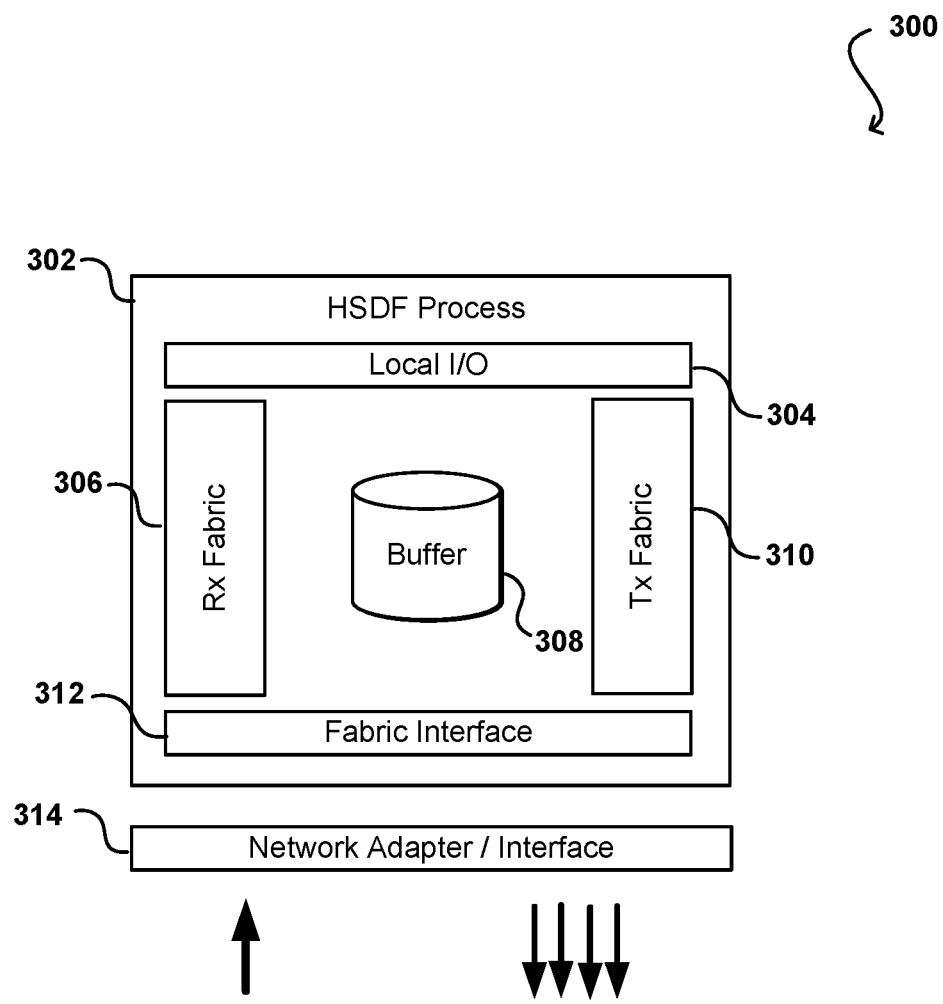
FIG. 3 illustrates an example high speed data forwarding configuration that can be utilized in accordance with various embodiments.

FIG. 3 illustrates an example implementation 300 of an HSDF process that can be utilized in accordance with various embodiments. In this example, an HSDF process 302 can sit on top of a network adapter or interface layer 314, such as may be based upon EFA, ENI, or another such networking product or protocol. The HSDF process 302 includes a fabric interface 312 for communicating with the network adapter or interface layer 314. In at least one embodiment, a library such as Libfabric can be used for the fabric interface 312, where Libfabric defines one or more user-space application programming interfaces (APIs) of, for example, an Open Fabrics Interface (OFI) framework, which can provide for the exporting of fabric communication services to applications. Libfabric can enable the HSDF process to communicate with an underlying EFA or ENI layer using an appropriate API or other such interface. The HSDF process 302 can create a receive fabric 306 which can take in one connection for a single data source or single input. The HSDF process 302 can also create a transmit fabric 310 that can include multiple transmitters to which client devices (or other devices) can connect. The process can utilize local input/output (I/O) 304 components to transmit data, which can be stored to at least one buffer 308 as appropriate. The local I/O 304 can be used to expose an underlying data stream to the kernel, as well as applications that are to process or utilize that data. When a given HSDF-enabled host starts up as a root source, it can wait for a device to connect to provide data to that host. Alternatively, the host can be pointed to another HSDF host to connect as a client, so it can receive the data stream. Such an approach can effectively create a chain of peer instances, with each peer instance registering with a prior peer instance in the chain. A set of registered peers then creates an overlay network that provides for functionality such as multicast. In this example, the local I/O 304 is where the multicast would occur, although the data could also be written to disk or buffer 308, or interacted with natively from an application using the HSDF process 302.

Figure 4:
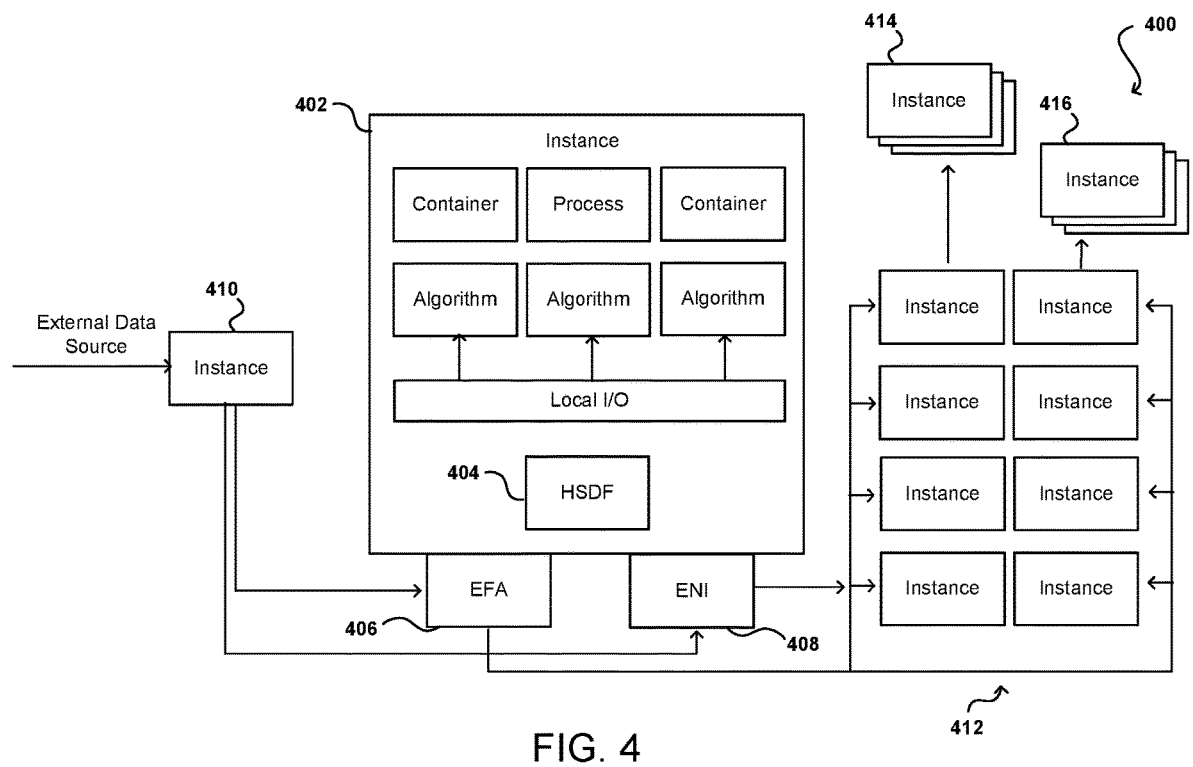
FIG. 4 illustrates a system for executing multiple processes on a multi-cast data stream that can be utilized in accordance with various embodiments.

In at least one example, an HSDF process 302 can utilize a single control loop with no threading. The executable can be relatively lightweight, such as may be able to be executed using a single processor (e.g., CPU) and requiring less than 2 GB of RAM for storage. In at least one embodiment, this HSDF process can also be run as a container. As mentioned previously, each of these fabrics can support multiple providers, such as RxM for a TCP socket-based implementation, or EFA for an SRD-based implementation, among other such options. These fabrics can enforce ordering on receive, with Reliable Datagram Messages using send after send ordering in at least one example As mentioned, multiple HSDF-enabled peer instances can work together, as may form an HSDF cluster 400 as illustrated in FIG. 4. Each instance 402, 410, 412, 414, 416 can have HSDF running inside. These instances can startup and register with each other, and then can receive data to a root instance 410 from an external data source. Once this data stream is received by a root instance 410, that stream can be fanned out to all other instances within this HSDF cluster 400. There may be multiple algorithms that are to process data on the stream, at potentially different times or in different sequences. An instance 402 can activate relevant processes and algorithms as appropriate, and the stream can be directed in sequence along a path as discussed in more detail later herein. In this example, these algorithms can connect to local I/O, whether that involves storage to disk, multicast, or transmission natively into HSDF 404, and can then receive the data. As illustrated, an instance may be able to communicate with other instances in the cluster using EFA or ENI, or both.

Figure 5:
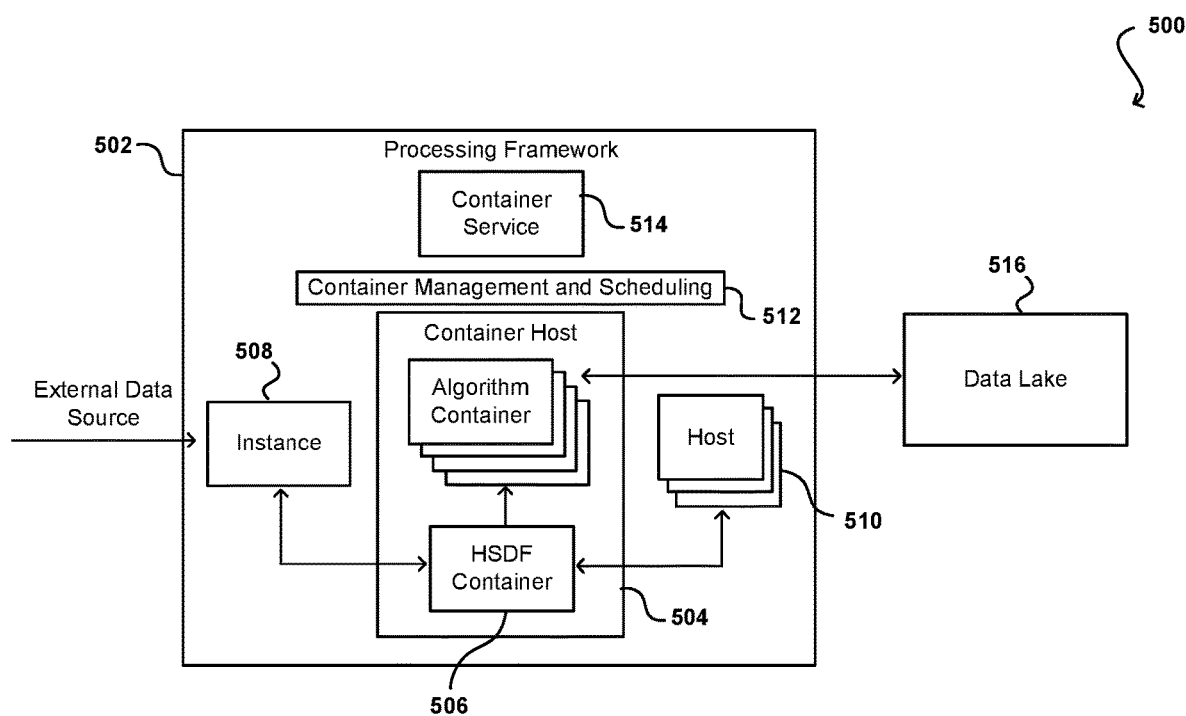
FIG. 5 illustrates an example processing framework that can be utilized in accordance with various embodiments.

In some embodiments, such a cluster can be part of a managed cluster, as may be managed by a system or service such as ECS (Elastic Container Service) from Amazon Web Services, Inc. In such an embodiment, HSDF can be run inside of a HSDF container 506, as illustrated in the container-based implementation 500 of FIG. 5, and other containers can then connect to that HSDF container 506 to obtain the data and perform their processing. These containers can then be scheduled at a higher level, such as by a container service 514 of the processing framework that is able to communicate with a respective container host, and activated to process the stream as needed. Scheduling may alternatively be performed or managed at a lower level, such as at the compute instance level, which would allow for at least some amount of management by a user. In this example, the data can be stored to a data lake 516 or storage service as appropriate for the various algorithm containers.

The components that make up a given HSDF cluster can depend upon aspects such as parameters of the data stream and the processing need of a relevant user. An HSDF cluster will generally include one or more peer instances each running an HSDF process. The number of such instances in a cluster can depend upon factors such as those mentioned, and may be fixed or may vary over time as those factors may also vary. The peer instances can be configured to intercommunicate, such as by using one or more network load balancers or using manual configuration files. This configuration can be sued to determine whether multicast is to be available for any given peer instance, and if so then HSDF can automatically transmit and make that available to the kernel, whereby the kernel can make the multicast broadcast available to any appropriate algorithms or applications that are running on the instance and have registered for the broadcast. As mentioned, an HSDF cluster can be both static and dynamic. In one example, an HSDF cluster can include 1 to n peer instances at any given time, and there can be a load balancer between each pair of instances (where one load balancer may be between multiple pairs). In such an approach, and edge can connect to a peer, and the peer can connect to the root, such that only a single connection is made through the load balancer for the interconnect. This process can be used to expand the cluster to include as many peer instances as may be needed at any given time. There can then be any number of edges or peers for a given root instance, and this cluster can be elastic as discussed elsewhere herein.

As mentioned, HSDF functionality can be provided through an executable or a container in different embodiments. This can include, for example, running HSDF using a container service, such as the Elastic Container Service (ECS) from Amazon.com, Inc. The use of such a cluster service can have various advantages, as it may be used to provide auto-scaling to maintain a mock data stream, such as for a "Best effort" transmission of large data objects. Such a service can also provide for the automated provisioning of data links, as well as a managed container log collection with automated metrics and monitoring dashboards. Such a service can also provide for automatic recovery from container or instance failures. A container service can also support multiple data chain types, including but not limited to single path, fanout, and hybrid data chain or path types. A container serviced can also support nodes enables with different technologies or protocols, such as may support EFA/SRD and RxM/TCP.

Figure 6A:
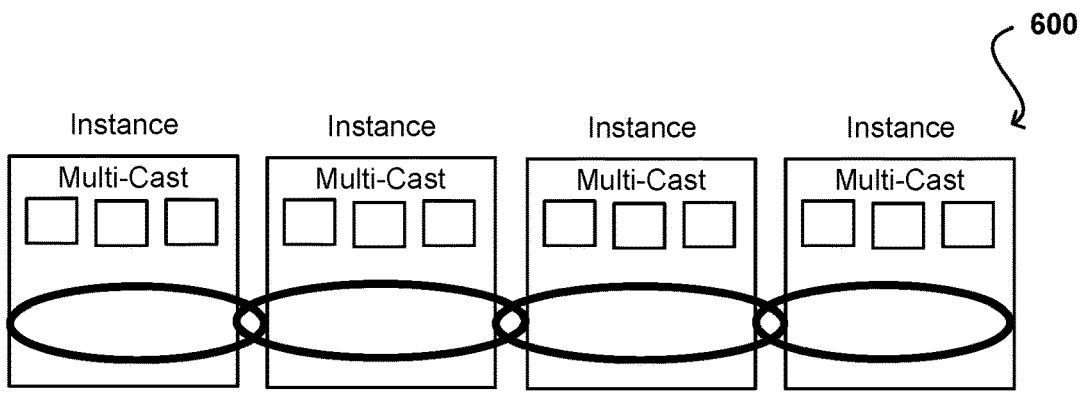
FIGS. 6A, 6B, and 6C illustrate various data paths that can be utilized in accordance with various embodiments.

As mentioned, there can be various paths used to transmit data as part of a multicast solution. As an example, FIG. 6A illustrates a single stream fanout 600 with multicast. In this example, one or more mission streams can be received by multicast to a bridge, whereby unicast files can be received to a local gateway. Multiple input multicast streams can then be propagated among peer instances using a single stream or chain of instances. In this example, each instance can, in turn, cause one or more applications or processes to be executed on a respective stream. In this example of an HSDF data fabric, each link in this single stream chain can correspond to a peer instance in the HSDF overlay layer. In this example, the input can be throttled by the total bandwidth, where for EFA a single stream throughput may be on the order of about 10-16 Gbps of total throughput, while for an ENI/ENA solution the total single stream throughput may be on the order of about 4-9 Gbps.

Figure 6B:
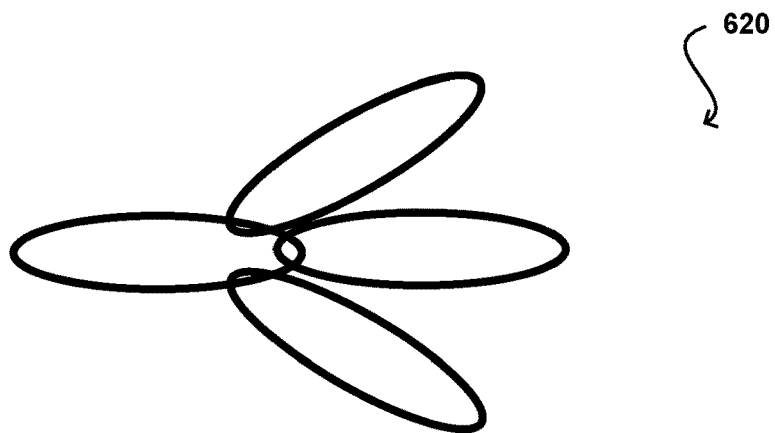
Figure 6C:
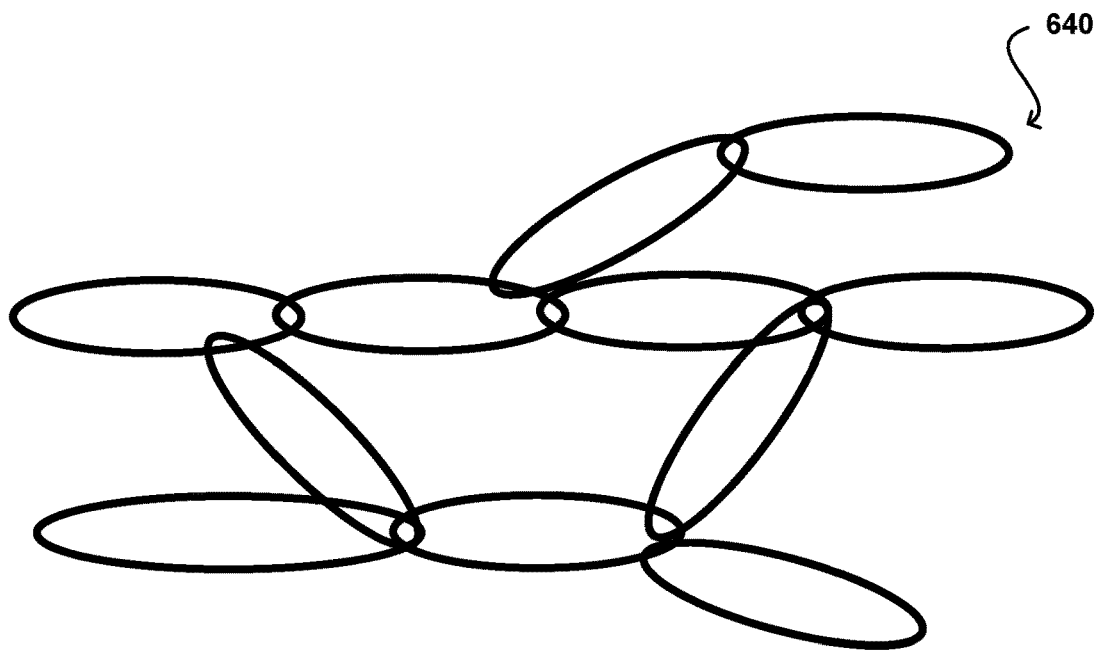

As mentioned, there can be various types of chains formed for different streams or implementations, such as are illustrated in FIGS. 6B and 6C. In each of these chains, there may be a single root instance but one or more branches that may occur at different locations along the chain. Such an implementation can allow for different processing to be performed on different branches, and in parallel where appropriate. As mentioned, there can be a limitation so to how fast HSDF can operate on an individual stream. In an example, a user may have a requirement that a system deployment be able to consistently handle 10 Gbps streams. This can be accomplished with EFA, for example, and additional bandwidth can be added by using a fan-out, such as is illustrated in chain 620 of FIG. 6B, as EFA allows for up to 100 Gbps of usable bandwidth. An ENI implementation may allow up to 25 Gbps, for example, as may be limited in part by use of TCP/IP. Once the necessary or desired bandwidth is determined, a cluster can be designed with an appropriate number of branches, nodes, or fan-outs to provide that bandwidth. In some embodiments, different applications may be processed using different resources, such as CPUs versus GPUs, which may benefit from different paths in the HSDF layer. The number of applications or processing of different types can also be used to determine how many links, nodes, or instances are in each branch of the chain. In some embodiments, multiple paths can enable different types of resources to be utilized, which can have benefits with respect to resource capacity and pricing. In some embodiments, multiple HSDFs can operate on a single machine, such and paths may include multiple chains on the same machine. In some embodiments a fan-in or funneling chain can be utilized as well, where input from multiple sources can be combined into a single path, or multiple multicast streams into a single fabric, such as where multiple streams are to undergo the same processing.

In the hybrid HSDF data fabric example 640 of FIG. 6C, links can be added to branches of a chain, or to create additional branches, as needed. For example, there may be a 5 Gbps stream, and the implementation may be limited to 10 Gbps. The path in the middle can provide 5 Gbps of bandwidth. There may be additional algorithms or processing needed, so a path can be added toward the bottom that can allow for different paths and algorithms to be used, but potentially at different speeds. Instead of utilizing larger capacity instances, the processing can be spread out among additional instances according to the paths of the data fabric. As illustrated, a branch may also merge back into an existing path, or may merge into a different path or branch. In some embodiments, there may also be multiple inputs or paths that may be combined at one or more chains or locations as discussed previously. Where to insert, start, end, reconnect, or merge one or more branches can be determined based upon several factors, such as a need for failure recovery, feedback, or type(s) of processing to be performed, as well as an ordering of that processing. Further, fabrics in at least some embodiments can be enabled to switch between protocols. One HSDF peer might be able to receive data in EFA, but transmit data using ENI. Each of the individual fabrics can be independent of the other, such that a receive fabric for a peer can be independent of the transmit fabric. Such an approach can enable a data stream to be translated from EFA to TCP, enabling that stream to be transmitted over a long distance to, for example, another data center or HSDF cluster.

Figure 7:
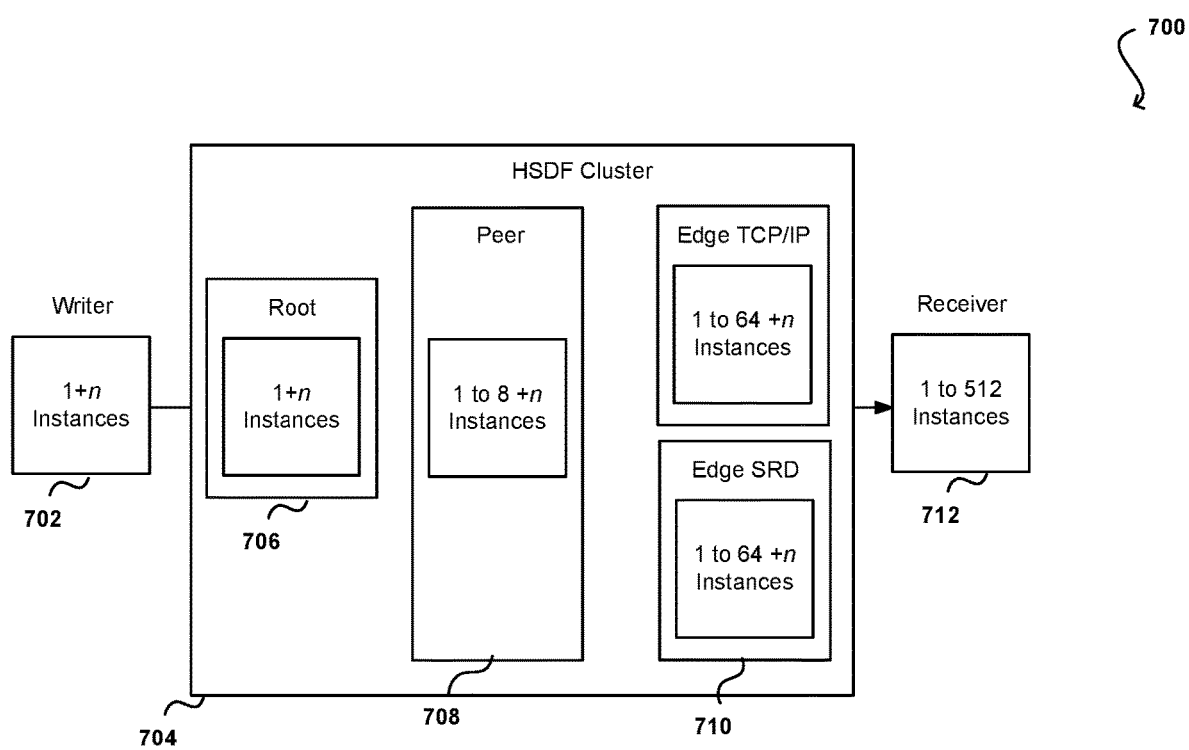
FIG. 7 illustrates an example fanout cluster configuration that can be utilized in accordance with various embodiments.

FIG. 7 illustrates different types of instances that may be utilized for such a chain 70. As mentioned, at least one writer 702 (which may be comprised of one or more instances) can generate a data stream that is sent to at least one root source instance 706. In this example, the instances used (or available to be used) for this data chain can be pulled from, or grouped into, a cluster of instances, here referred to as an HSDF cluster. Any appropriate clustering algorithm or approach, or instance allocation approach, can be used to determine these clusters, as discussed in more detail elsewhere herein. In this example, each root instance can forward the data to one or more peer instances 708 according to the form of the data chain or path, which can forward to other peer instances as well, as may include one or more edge instances 710 that can forward to at least one receiver 712, which can also include one or more instances. As mentioned previously, various of these instances may be of different types, capabilities, or configurations, as may be determined based upon factors such as the type of processing to be performed or the cost of the given instances, where the cost can relate to a compute, resource, storage, or capacity requirement or usage.

As mentioned, such HSDF functionality can be advantageous for isolated regions with otherwise limited capacity gateways. Such functionality can also be beneficial in situations where there is a need for multiple, large, concurrent data streams, such as streams of uncompressed, high resolution data that need to be processed concurrently and in real time. Such functionality can sit in a commercial region, isolated secure region, or at an edge location, either inside or outside a data center, among other such options.

Figure 8:
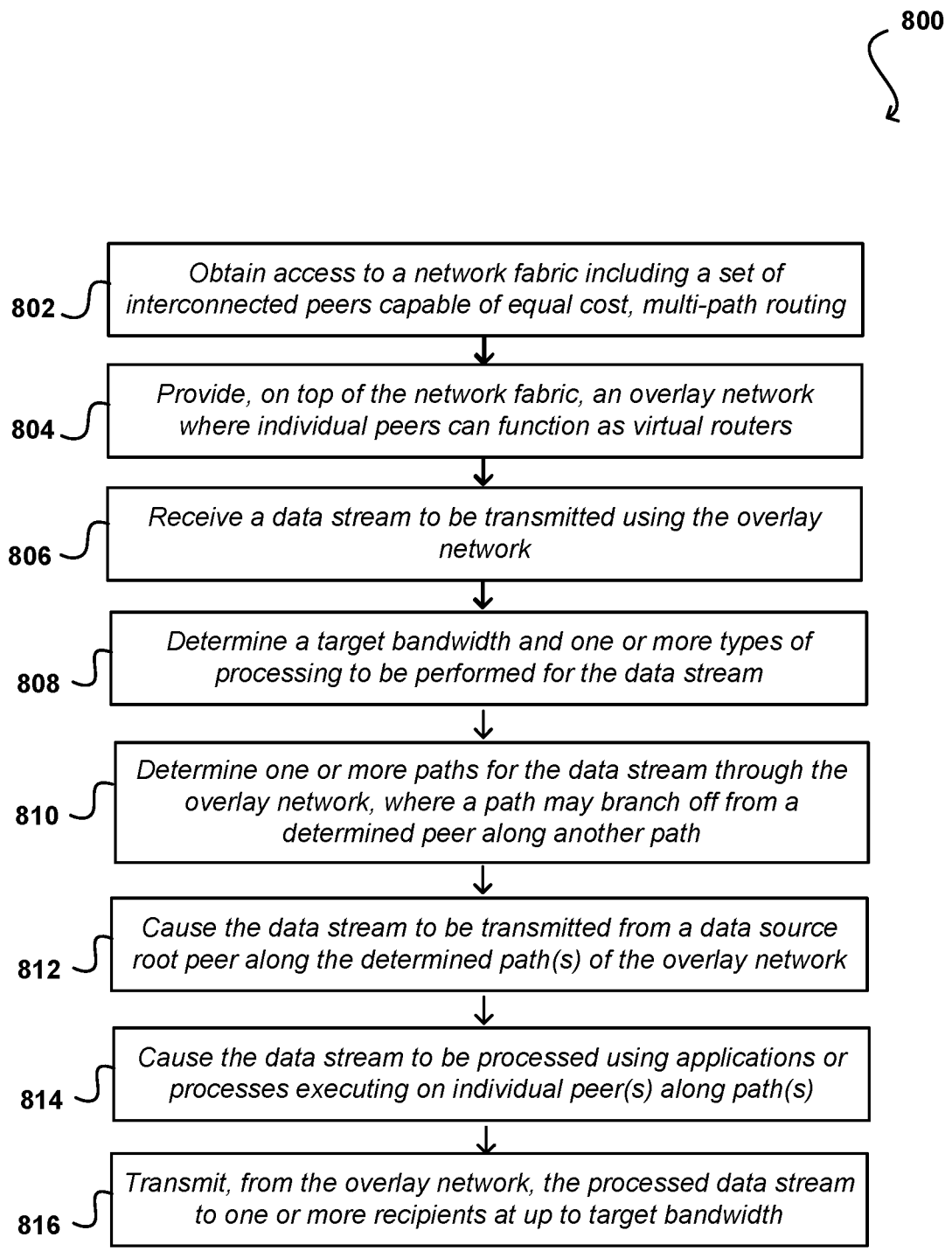
FIG. 8 illustrates an example process for performing multicast of a data stream that can be utilized in accordance with various embodiments.

FIG. 8 illustrates an example process for transmitting a data stream that can be utilized in accordance with various embodiments. It should be understood that for this and other processes presented herein that there can be additional, fewer, or alternative steps performed in similar or alternative orders, or at least partially in parallel, within the scope of the various embodiments unless otherwise specifically stated. In this example, access is obtained 802 to a network fabric that includes a set of interconnected peers capable of performing equal cost, multi-path routing. These peers may include, for example, computing resources or resource instances, as may include physical or virtual machines, or portions thereof. In at least one embodiment, these peers may be resources that are allocated to a user or entity as part of a cloud or shared-resource offering or environment. An overlay network can then be provided 804 on top of this network fabric, where individual peers can function as virtual routers of the overlay network. These individual peers can also execute processes or applications to be performed on data streams received to those peers, as may be provided or determined by a user or entity. In at least one embodiment, this overlay network can provide for multicasting of a received data stream, where bandwidth provided by this overlay network can exceed any limit placed on individual peer transmissions, and can be determined based at least in part upon a number of paths for the data stream through the overlay network.

Once such a network configuration is in place, a data stream can be received 806 that is to be transmitted using the overlay network. As mentioned, this may include a data stream that may require a high bandwidth transmission or that is to have one or more types or processing performed, among other such options. In this example, a target bandwidth and one or more types of processing to be performed on the data stream can be determined 808. One or more paths (or data chains) for the data stream through the overlay network can then be determined 810, where a given path may branch off from another path at a determined peer along that path. The number of paths can be determined based upon factors such as the total bandwidth needed or desired versus the bandwidth available over a given peer-to-peer connection. The number of paths may also be determined based upon factors such as different applications or processes to be executed on the data stream, where at least some of those applications or processes are to be performed separately or independently and may require separate paths. Different paths may also be utilized for resource or cost optimization, for example, such as where certain types of processing may benefit from different types or hardware, software, or peer configuration. The location, or branch point, for each path may also depend on at least some of these factors, as well as to provide one or more recovery points in case of failure along one or more paths or at one or more peers. As mentioned, the overlay network paths may follow one or more configurations or topologies, as may include single stream, path, fan-out, fan-in, or hybrid configurations or chain types.

Once the paths for the data stream through the overlay network have been determined and configured, the data stream can be caused 812 to be transmitted from a data source root peer, or other initial source peer for all paths, along the determined path(s) of the overlay network. The data stream, while being transmitted or otherwise propagating along the path(s) can be caused 814 to be processed using applications or processes executing on the peers along the path(s). As mentioned, this may include an ordering of processing or types of peers to perform the processing, where the ordering of processing can be in parallel or concurrent for at least some of the processing. In some embodiments the same processing might be performed for each path, while in other embodiments the processing might be performed once on the data stream then fanned out into multiple paths of the processed data, among other such options. The processed data stream can then be transmitted 816 from the overlay network to one or more recipients at up to the target bandwidth provided by the overlay network. It should be understood that different overlay configurations or transmission paths may be utilized for different data streams, or different transmissions of the same data stream.

Figure 9:
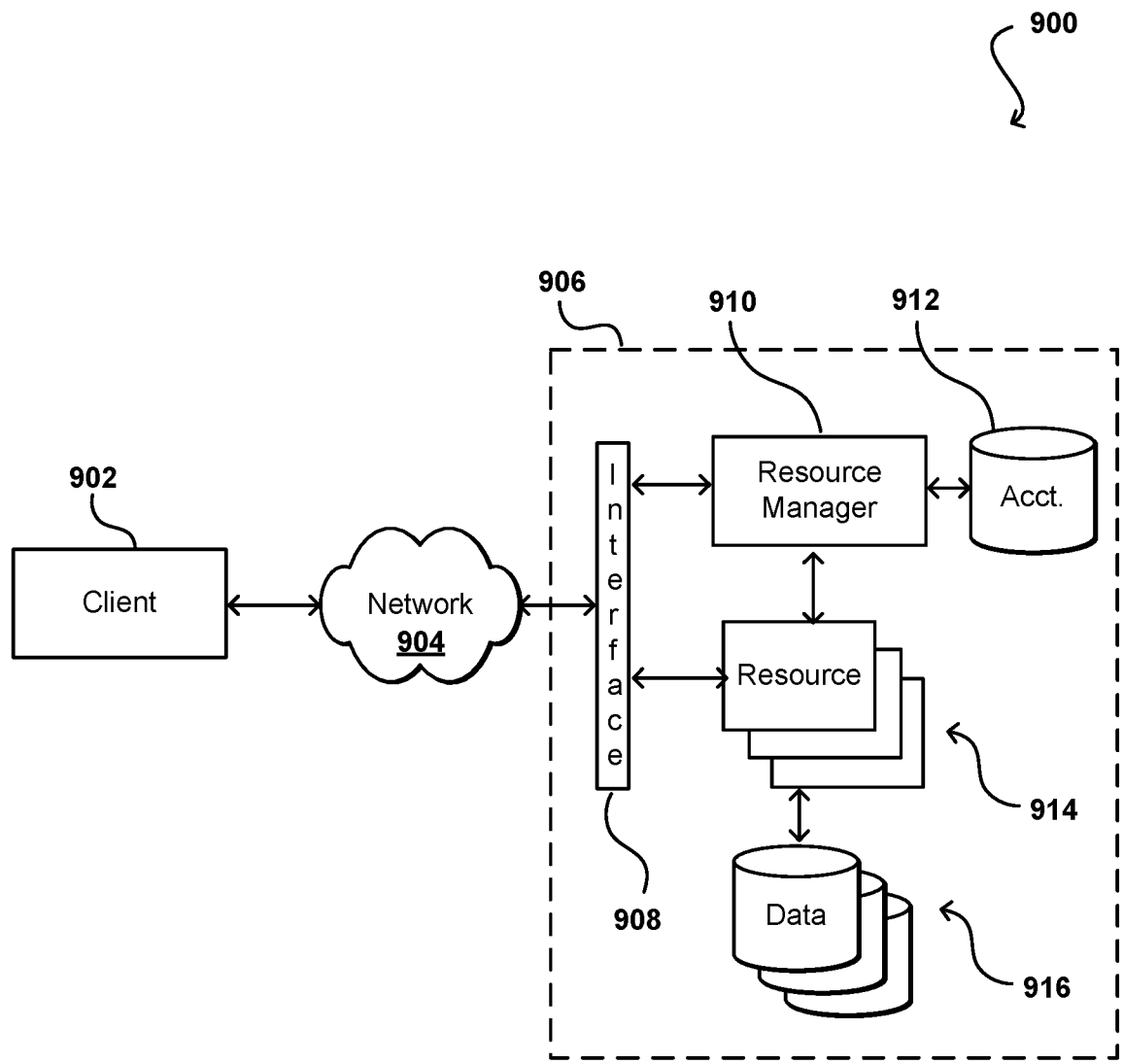
FIG. 9 illustrates components of a resource environment in which aspects of various embodiments can be implemented.

FIG. 9 illustrates an example environment 900 in which aspect of various embodiments can be implemented. Such an environment can be used in various embodiments to provide resource capacity for one or more users, or customers of a resource provider, as part of a shared or multi-tenant resource environment. In this example a user is able to utilize a client device 902 to submit requests across at least one network 904 to a multi-tenant resource provider environment 906. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 904 can include any appropriate network, including an intranet, the Internet, a cellular network, a local area network (LAN), or any other such network or combination, and communication over the network can be enabled via one or more wired and/or wireless connections. The resource provider environment 906 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 906 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 914 of one or more types. These types can include, for example, application servers operable to process instructions provided by a user or database servers operable to process data stored in one or more data stores 916 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 914 can submit a request that is received to an interface layer 908 of the provider environment 906. The interface layer can include application programming interfaces (APIs) or other exposed interfaces enabling a user to submit requests to the provider environment. The interface layer 908 in this example can also include other components as well, such as at least one Web server, routing components, load balancers, and the like. When a request to provision a resource is received to the interface layer 908, information for the request can be directed to a resource manager 910 or other such system, service, or component configured to manage user accounts and information, resource provisioning and usage, and other such aspects. A resource manager 910 receiving the request can perform tasks such as to authenticate an identity of the user submitting the request, as well as to determine whether that user has an existing account with the resource provider, where the account data may be stored in at least one data store 912 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 902 to communicate with an allocated resource without having to communicate with the resource manager 910, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 910 (or another such system or service) in this example can also function as a virtual layer of hardware and software components that handles control functions in addition to management actions, as may include provisioning, scaling, replication, etc. The resource manager can utilize dedicated APIs in the interface layer 908, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 908 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 10:
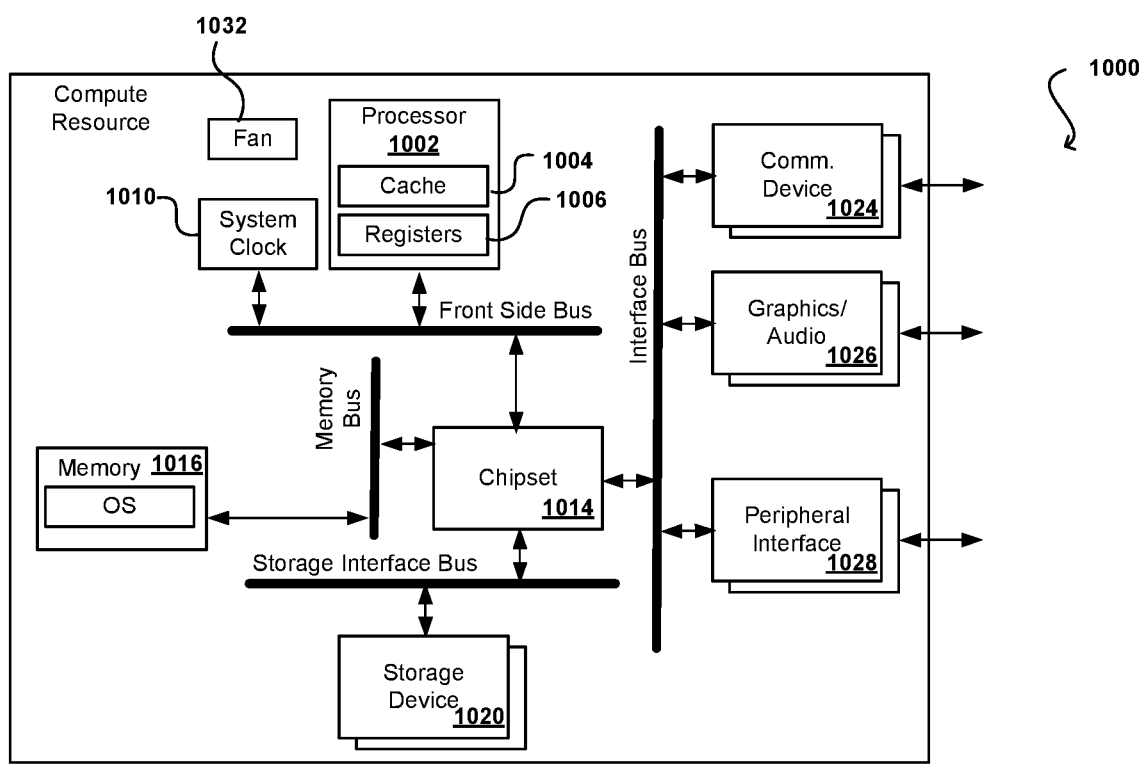
FIG. 10 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 10 illustrates components of an example computing resource 1000 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 1000 (e.g., a desktop or network server) will have one or more processors 1002, such as central processing units (CPUs), graphics processing units (GPUs), and the like, that are electronically and/or communicatively coupled with various components using various buses, traces, and other such mechanisms. A processor 1002 can include memory registers 1006 and cache memory 1004 for holding instructions, data, and the like. In this example, a chipset 1014, which can include a northbridge and southbridge in some embodiments, can work with the various system buses to connect the processor 1002 to components such as system memory 1016, in the form or physical RAM or ROM, which can include the code for the operating system as well as various other instructions and data utilized for operation of the computing device. The computing device can also contain, or communicate with, one or more storage devices 1020, such as hard drives, flash drives, optical storage, and the like, for persisting data and instructions similar, or in addition to, those stored in the processor and memory. The processor 1002 can also communicate with various other components via the chipset 1014 and an interface bus (or graphics bus, etc.), where those components can include communications devices 1024 such as cellular modems or network cards, media components 1026, such as graphics cards and audio components, and peripheral interfaces 1028 for connecting peripheral devices, such as printers, keyboards, and the like. At least one cooling fan 1032 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 1002 can obtain data from physical memory 1016, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 1004 in at least some embodiments. The computing device 1000 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 1028, a communication device 1024, a graphics or audio card 1026, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 1002 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive messages, such as datagrams.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining access to a network fabric including a plurality of interconnected peers and a source peer in an isolated network environment, the plurality of interconnected peers of the network fabric supporting equal cost and multi-path routing through the network fabric using connections with limited bandwidth;
   providing, on top of the network fabric, an overlay network wherein the plurality of interconnected peers are enabled to function as virtual routers for a data stream, wherein one or more peers of the plurality of interconnected peers are enabled to perform different types of processing on data of the data stream, the different types of processing being different from the equal cost and multi-path routing supported by the plurality of interconnected peers;
   determining a target bandwidth for transmission of the data stream, the target bandwidth being greater than the limited bandwidth;
   determining, starting from the source peer and based at least in part upon the target bandwidth and the limited bandwidth per path, a plurality of paths for multicast transmission of the data stream through the overlay network; and
   causing the data stream to be transmitted through the overlay network and directed from the source peer to be received to one or more recipients, external to the isolated network environment, at up to the target bandwidth.

2. The computer-implemented method of claim 1, wherein only one path of the plurality of paths is required to start at the source peer, and wherein other paths of the plurality of paths are enabled to branch from locations of selected peers along selected paths of the plurality of paths.

3. The computer-implemented method of claim 1, further comprising:
   determining the plurality of paths, including a number of the paths and starting points for individual paths of the plurality, based at least in part upon one or more applications or the different types of processing to be executed on the data stream, wherein at least a subset of the applications or different types of processing are capable of being performed at least partially in parallel.

4. The computer-implemented method of claim 1, wherein the plurality of peers include physical or virtual computing resources or resource instances.

5. The computer-implemented method of claim 1, wherein functionality of the overlay network is provided through an executable or a container.

6. A method comprising:
   receiving a data stream to an overlay network, the overlay network operating on top of a plurality of interconnected peers and a source peer, wherein the plurality of interconnected peers are enabled to perform different types of processing on data of the data stream, the different types of processing being different from equal cost and multi-path routing also supported by the plurality of interconnected peers;
   determining at least one transmission criterion including a target bandwidth for transmission of the data stream or the different types of processing to be performed on the data of the data stream;
   determining one or more paths for the transmission of the data stream through the overlay network, wherein the one or more paths satisfy the at least one transmission criterion; and
   transmitting the data stream through the overlay network and directed from the source peer using the one or more paths comprised of a determined subset of the interconnected peers.

7. The method of claim 6, wherein the target bandwidth is greater than a limited bandwidth for transmission between any pair of the interconnected peers, and wherein the data stream is transmitted via multicast using the one or more paths.

8. The method of claim 7, wherein the limited bandwidth is a constraint enforced by a network gateway of an isolated network environment or a capacity-limited resource environment.

9. The method of claim 6, wherein determining the paths includes selecting one or more paths, starting at one or more locations along the one or more paths, in order to cause the different types of processing to be performed in a determined sequence, wherein the determined sequence is enabled to be at least partially in parallel.

10. The method of claim 6, wherein the plurality of interconnected peers are capable of the equal cost and multi-path routing through the network fabric using connections with limited bandwidth.

11. The method of claim 9, wherein different peers along different paths are enabled to execute different applications for the different types of processing to be performed on the data of the data stream, and wherein the different types of processing along the different paths is enabled to support high performance computing or massive parallel processing.

12. The method of claim 6, wherein the plurality of interconnected peers include physical or virtual computing resources or resource instances.

13. The method of claim 6, wherein functionality of the overlay network is provided through an executable or a container.

14. The method of claim 6, wherein the one or more paths start from the source peer that is to receive the data stream to be propagated concurrently to the one or more paths.

15. The method of claim 14, wherein the one or more paths are configured in a single path, fanout, or hybrid path configuration starting at the source peer.

16. A data transmission system, comprising:
a network fabric including a plurality of interconnected peers and a source peer configured to perform equal cost and multi-path routing, the plurality of interconnected peers enabled to perform different types of processing on data of a data stream, the different types of processing being different from the equal cost and multi-path routing; and
an overlay network on top of the network fabric in order to forward the data stream, wherein the overlay network is configured to:
determine, for a received data stream, at least one transmission criterion including a target bandwidth for transmission of the data stream or the different types of processing to be performed on the data of the data stream, wherein one or more peers of the plurality of interconnected peers are enabled to perform the different types of processing on the data stream;
determine one or more paths for the transmission of the data stream through the overlay network, wherein the one or more paths satisfy the at least one transmission criterion; and
transmit the data stream through the overlay network and directed from the source peer using the one or more paths comprised of a determined subset of the interconnected peers.

17. The data transmission system of claim 16, wherein the network fabric operates on top of a network layer, the network layer including a plurality of physical or virtual compute resources allocated to a user or entity, wherein the plurality of physical or virtual compute resources are used to provide the interconnected peers.

18. The data transmission system of claim 16, wherein the target bandwidth is greater than a limited bandwidth for transmission between any pair of interconnected peers, and wherein the data stream is transmitted via multicast using the one or more paths.

19. The data transmission system of claim 18, wherein the limited bandwidth is a constraint enforced by a network gateway of an isolated network environment or a capacity-limited resource environment.

20. The data transmission system of claim 16, wherein determining the paths includes selecting one or more paths, starting at one or more locations along the one or more paths, in order to cause the different types of processing to be performed in a determined sequence, wherein the determined sequence is enabled to be at least partially in parallel.

* * * * *